United States Patent
Komiya et al.

[11] Patent Number: 6,092,547
[45] Date of Patent: Jul. 25, 2000

[54] DOUBLE FUNNEL FLOAT VALVE

[76] Inventors: Keinosuke Komiya; Ken Komiya, both of 21-10 Toshin-cho, 1-chome, Itabashi-ku Tokyo, Japan

[21] Appl. No.: 09/244,822

[22] Filed: Feb. 4, 1999

[51] Int. Cl.[7] .............................. F16K 31/22; F16K 33/00
[52] U.S. Cl. ........................ 137/192; 137/202; 137/391; 137/433; 137/895; 73/322.5; 141/199; 222/64
[58] Field of Search ........................... 73/322.5; 137/430, 137/433, 192, 391, 888, 895, 202; 141/198, 199; 222/64, 69

[56] References Cited

U.S. PATENT DOCUMENTS

| | | | |
|---|---|---|---|
| 1,897,492 | 2/1933 | Ledoux | 137/433 |
| 2,627,868 | 2/1953 | Runnels | 137/433 |
| 3,759,281 | 9/1973 | Falcutta | 137/433 |
| 4,096,879 | 6/1978 | Serur et al. | 137/433 |
| 4,269,222 | 5/1981 | Palti | 137/433 |
| 4,328,820 | 5/1982 | Serur | 137/433 |
| 5,409,033 | 4/1995 | Hirayama | 137/433 |
| 5,662,138 | 9/1997 | Wang | 137/433 |
| 5,722,961 | 3/1998 | Fan | 137/433 |

FOREIGN PATENT DOCUMENTS 446827  5/1936  United Kingdom ................... 137/433

*Primary Examiner*—George L. Walton

[57] ABSTRACT

A combination valve and trap device is described for use in liquid supply and liquid disposal systems. Floats of various size, weight and shape are encased in cylindrical housings with inverse funnel inlets and outlets. The device functions as a valve, trap and back-flow safety device, depending on the float configuration, requiring neither mechanical apparatus nor external power supply for functionality.

1 Claim, 3 Drawing Sheets

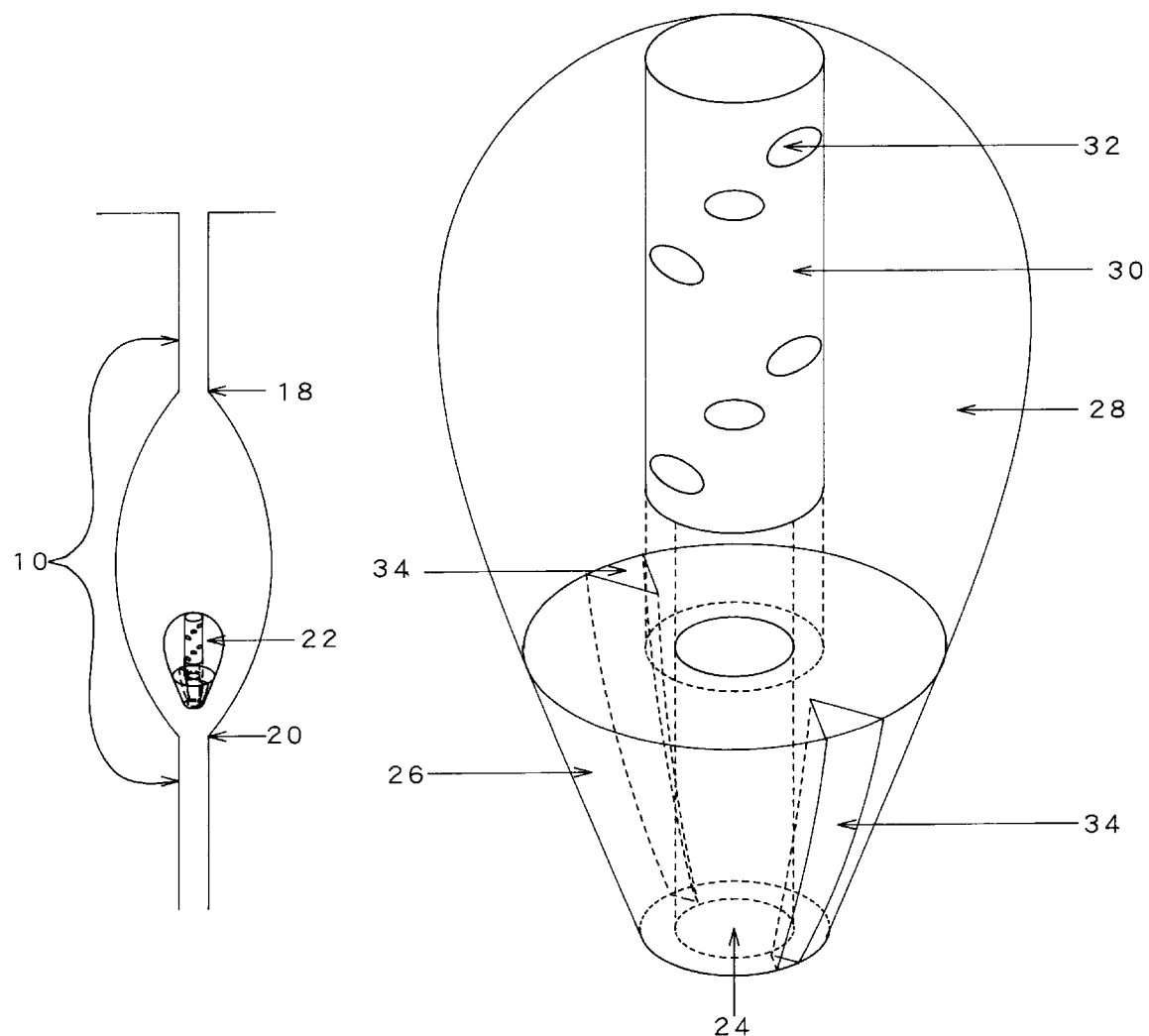

DOUBLE FUNNEL FLOAT VALVE

CROSS REFERENCES TO RELATED APPLICATIONS

Komlya et al; Application Ser. No. 08/923,977; Group Art No. 3753

Examiner: Gerald A. Michalsky

BACKGROUND—FIELD OF INVENTION

This invention relates to valves and traps, specifically to a floating ball or shuttle within double funnels, which will be able to form a sealing relation at both the upper and lower funnel spout points of the double funnel float valve in liquid supply and liquid disposal systems.

BACKGROUND—DESCRIPTION OF PRIOR ART

In both liquid supply and liquid disposal systems, various flow control mechanisms are used to regulate the rate, volume, and direction of the circulated liquid.

Presently, a plurality of devices are used as valves, for controlling the flow of air, liquid, or gas in one direction only. Traps are commonly used in disposal systems and are usually U-shaped or S-shaped drain pipes, or drain assembly parts, in prior art, that hold liquid so as to prevent unpleasant gasses entering the drain.

OBJECTS AND ADVANTAGES

Accordingly, several objects and advantages of our invention are:

1) The ball or shuttle float, being heavier than air, seals the lower funnel, preventing air and/or gas from escaping/flowing through the valve; thereby functioning as a trap;
2) The ball or shuttle float, being lighter than liquids, lifts and allows one way flow if the liquid through the valve, but seals the upper funnel in the event of over-flow and/or back-flow.
3) A variation of the valve, in which liquid is constantly present within the double funnels and the normal position of the ball or shuttle seals the upper funnel, also functions as a foot-valve or anti-reverse flow valve.
4) Another variation is forseen, in which an aspiratory shuttle is normally seating the lower funnel, acting as a drain trap, but with the addition of an air aspirator within the shuttle that will act as a breather during situations involving abrupt or rapid drainage.
5) The weight and size of the ball or shuttle floats can be adjusted to allow the escape of air and/or gas at specific pressures as a safety feature.
6) The design is such that the manufacture and maintenance can be inexpensive and durable.
7) The valve size and construction is such that it can be easily added-on to existing plumbing, drains, or liquid distribution systems.

Still further objects and advantages will become apparent from a consideration of the ensuing description and accompanying drawings.

BRIEF DESCRIPTION OF THE DRAWINGS

FIG. 3 is a sectional view of our invention in a liquid disposal system and embodies the invention as a trap utilizing an aspiratory shuttle as a breather.

Figure 1:
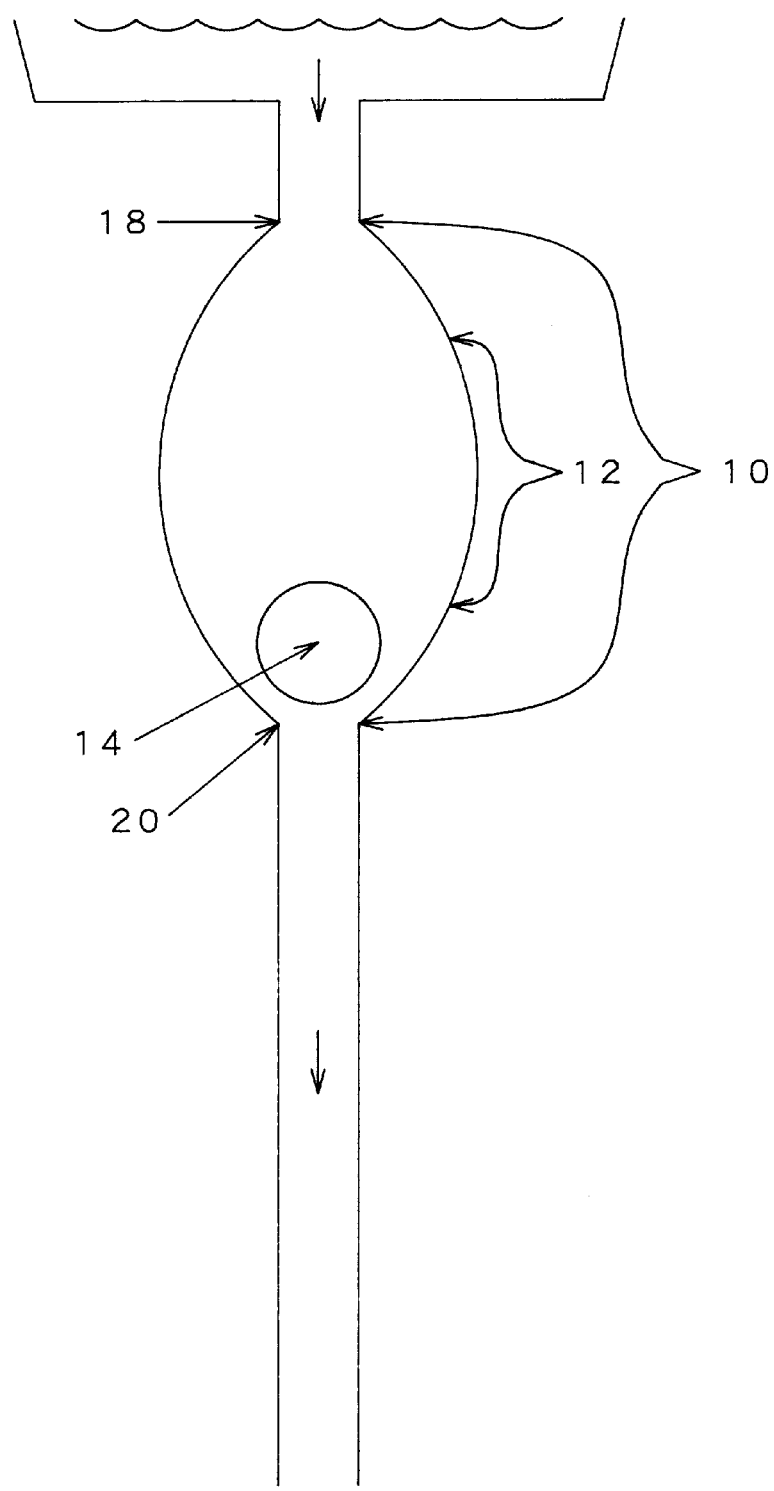
FIG. 1 is a sectional view of the double funnel float valve embodying our invention.

REFERENCE NUMERALS 10 double funnel float valve
12 double funnel
14 floating ball
16 weighted oval shuttle
18 spout inlet
20 spout outlet
22 aspiratory shuttle
24 aspirator hole
26 weighted shuffle bottom
28 upper hollow shuffle top
30 plastic core
32 air holes
34 breather notches
36 pump

SUMMARY

Our Invention relates to a float valve device which, in addition to the flow control mechanism usually associated with a valve in liquid supply and liquid disposal systems, also functions as a safety measure to prevent back-flow. An additional structural function is to act as a trap, even in the absence of liquid, to prevent objectionable odors and gas from passing through the double funnel valve.

We accomplish this with only one moving part, a body capable of floating in the liquid passing through the inverse double funnel valve housing. When liquid is not in the system, the float rests in a sealing relation with the the lower funnel spout outlet, guided to that sealing position by the funnel shape and held in place by gravity. The shape and specific weight of the floating body are desirably chosen so that it is always held fast in sealing relation with the outlet.

Liquid flowing Into the valve from either the inlet or outlet will lift the float away from the lower funnel spout outlet allowing flow down the lower funnel spout outlet, but preventing over-flow or back-flow by way of the upper funnel spout inlet structure guiding the float into a sealing relation as the surface level of the liquid reaches the upper funnel inlet sealing point, thereby allowing flow of the liquid on in the drain or downward direction.

Thus both valve and trap functions are accomplished without mechanical means and without the need for external power.

PREFERRED EMBODIMENT—DESCRIPTION

In FIG. 1 we show a sectional view of the double funnel float valve 10 embodying our invention. The valve/trap consists of two parts: a hollow tube tapered at both ends, hence a double funnel 12; and a floating ball 14 or weighted oval shuttle 16 housed within the double funnel tube.

The double funnel tube can be made of plastic or metal and be fitted together, after insertion of the ball or oval shuttle, by using a seal and a standard bolted air-tight flange. This allows easy maintenance and replacement of the float as necessary.

The ends of the funnel tube, spout inlet 18 and spout outlet 20, will be fitted with rotating coupling nuts to enable the valve to be connected to standard drain or liquid supply piping with industry standard sizes and threads.

The floating ball 14 will be a smooth orb made of plastic and some additional material to allow adjustment of its' weight between the range of being heavier than air and lighter than the liquid to flow through the valve/trap. The floating ball 14 size should be larger than the inlet and outlet spouts, but smaller than the housing inner diameter, and have a hardness lower than that of the housing material.

The weighted oval shuttle 16 will have the lower end of the oval weighted to be heavier than the top, to allow better positioning within the funnel tube, but still capable of floating in the liquid. We envision this to also be made of plastic. The plastic parts are also envisioned to contain bacteria killing material.

The double funnel float valve 10 must be installed in a vertical position along the piping as the float seats in the upper spout inlet and is held in place by the surface level of the liquid, and seals the lower funnel spout outlet 20 by gravity, hence the upper and lower spouts must be perpendicular to the horizon in order to form a sealing relation.

Figure 2:
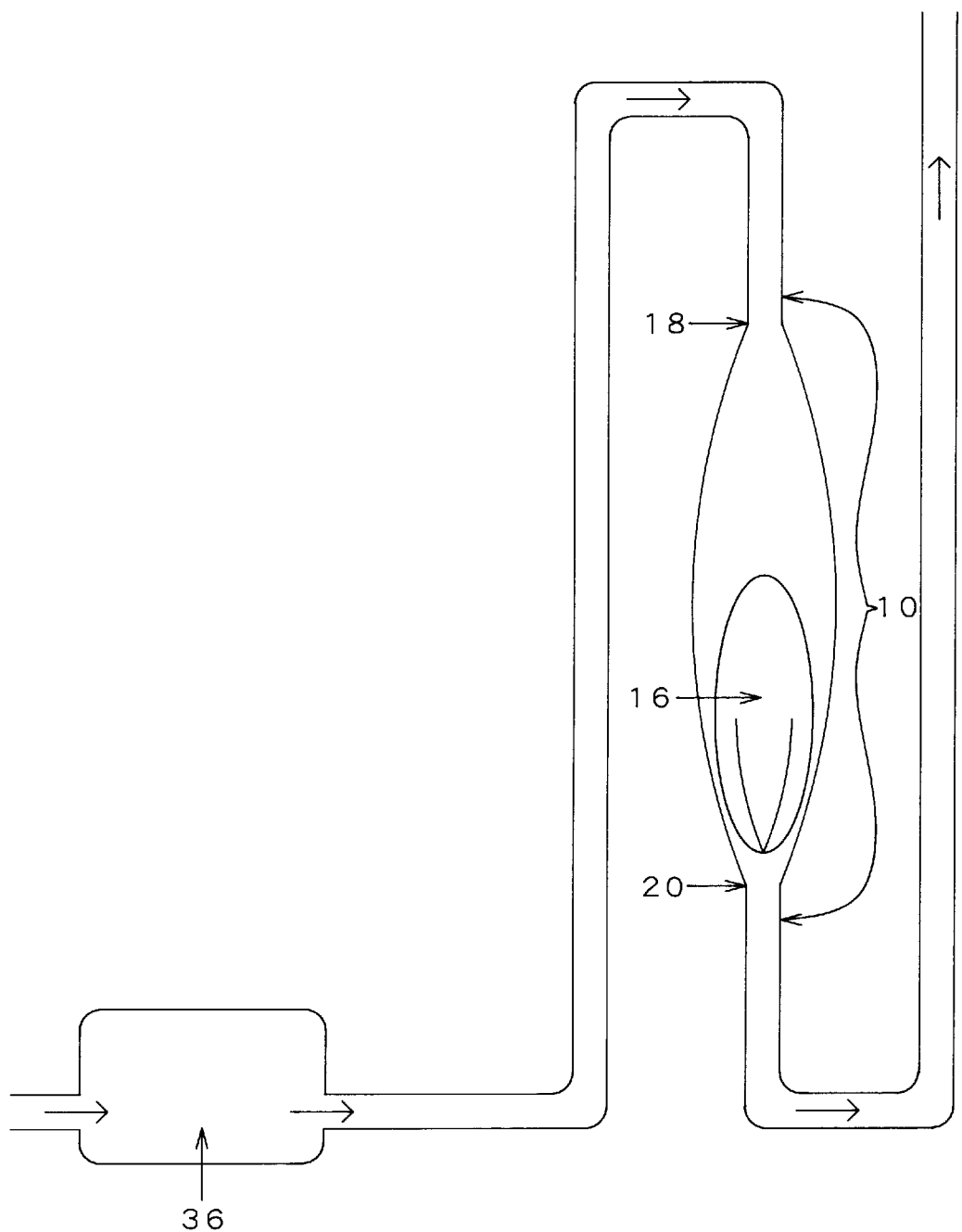
FIG. 2 is a sectional view of a liquid supply pump and plumbing, which embodies the invention with a weighted oval shuttle float functioning as an anti-reverse flow valve.

FIG. 2 shows a sectional view of a liquid supply system using a pump 36 and plumbing which embodies the invention with an weighted oval shuttle 16 float functioning as an anti-reverse flow valve. In this embodiment the weighted oval shuttle 16 would be manufactured with grooves in the outer surface which would guide the passage of water past the weighted oval shuttle 16 float and through the lower spout outlet 20 should the pumbed pressure of the liquid force it against the lower spout outlet 20. The grooves must be sufficiently large so as to allow the specified volume of the liquid to pass through the lower spout outlet 20.

FIG. 3 is a sectional view of our invention in a liquid disposal system and embodies the invention as a trap with a pear-shaped aspiratory shuttle 22. The aspiratory shuttle 22 is made of plastic and has a smooth outer surface on the larger top end suitable to form a sealing relation with the upper funnel spout inlet 18 to prevent liquid back-flow. The smaller bottom of the shuttle has an aspirator hole 24 at dead-center bottom and is weighted so as to remain perpendicular when floating in liquid. The aspirator hole goes through the solid weighted shuttle bottom 26 and enters the upper hollow shuttle top 28. There are also two breather notches 34 in the weighted shuttle bottom 26. A plastic core 30 runs through the center of the pear-shaped aspiratory shuttle 24 interior to add structural support, having air holes 32 in the hollow portion to facilitate pressure equalization. The upper hollow shuttle 28 interior, acting as an aspirator in partial vacuum conditions, has collapsable sides, which create a partial vacuum themselves as they return to the normal pear-shape of the the aspiratory shuttle 22, following rapid draining conditions, reinflating the upper hollow shuttle top 28.

PREFERRED EMBODIMENT—OPERATION

In FIG. 1 we show our invention embodied in a liquid disposal system. Waste liquid drains from an outlet in a sanitary convenience, such as a wash basin, via a pipe drain, into the upper inverted funnel spout inlet 18 of our double funnel 10 valve. Gravity causes the liquid to flow into the lower funnel spout inlet 18, lifting the floating ball 14, which is lighter than the liquid, from its' normal seat, which seals the lower funnel spout outlet 20 due to gravity, being heavier than air, thereby allowing the liquid to contine flowing down the drain piping.

As the liquid flows down the drain, the floating ball 14 decends with the surface level of the liquid and is guided by the spherical funnel to seat in a sealing relation with the funnel spout outlet 20, where it Is held in place by its' weight and gravity. The shape and specific weight of the floating ball 14 is desirably chosen so as to always be held in a sealing relation to the spout outlet 20 of the lower funnel, thereby functioning as a trap to prevent objectionable gas from entering the drain above.

In the event of a backflow of liquid, the floating ball 14 is lifted by the surface level of the liquid and guided by the upper funnel shape until it seats and seals the upper funnel spout inlet 18, thereby functioning as a valve, preventing back-flow of liquid into the drain above and allowing liquid flow only in the down drain direction.

FIG. 2 shows our double funnel float valve in a liquid supply system, wherein liquid is pumped from a lower supply source to an elevated tank or storage container. In this alternate configuration, the normal position of the float; in this drawing shown as an optional weighted oval shuffle 16 shape, is a sealing relation with the upper funnel spout inlet 18, wherein the weighted oval shuttle 14 float, being lighter than the liquid, is held in place by the gravitational force of the elevated liquid.

When the pump 36 is in operation, the higher pressure of the pumped liquid forces the weighted oval shuttle 16 float down from the sealing relation with the upper funnel spout inlet 18 and pumps the liquid one-way to the elevated storage tank. As a safety feature, the lower half of the weighted oval shuttle 16 float will have a grooved surface which will be capable of conducting the liquid through the lower funnel spout outlet 20 in the event that the pumped liquid pressure is such that it forces the weighted oval shuttle 16 float against the lower funnel spout outlet 20.

When power for the pump 36 is turned off, the weighted oval shuttle 16 float, being lighter than the liquid, floats to a sealing relation with the upper funnel spout inlet 18, guided by the funnel shape, and held in place by gravitional pressure of the liquid, thereby protecting the pump 36 by functioning as an anti-reverse flow valve.

In FIG. 3 we show an alternate use of the double funnel 10 float valve in a liquid disposal system as a safety device i n the event of sudden increases in air, gas, or liquid pressures within the system and, conversley, sudden or abnormal drainage, which might occur, for example, under flood conditions. Here the streamline shape/

What is claimed is:

1. A valve device useful in liquid supply and liquid disposal systems comprising a float encased in a cylindrical housing, having inverse funnel spouts as inlet and outlet, and in which the normal position of the float is a sealing relation with the lower funnel spout outlet, and functioning as a trap wherein the absence of liquid is the normal state, but requiring back-flow protection and/or rapid draining under abnormal conditions, with the specifications of an aspiratory, pear-shaped, float being such that:

a. The diameter of the hollow upper portion is larger than both the upper funnel spout inlet and the lower funnel spout outlet, preventing passage of the aspiratory shuttle through either end of the valve and being able to form a sealing relation with the upper funnel spout inlet as a floating body guided by the funnel shape employed;

The diameter of the weighted shuttle bottom is tapered such that the solid weighted bottom, with breather notches and an aspirator hole at dead-center bottom, enters into the lower funnel spout outlet, and the sealing relation with the lower funnel spout outlet is formed above the hole and breather.

An inner core with a diameter greater than the spout inlet and outlet is inserted for structural strength and to prevent passage of the aspiratory shuttle through the inlet and outlet of the housing;

b. The specific gravity is such that the surface level of a liquid will cause the weighted aspiratory shuttle to rise with the liquid to form a sealing relation with the upper funnel spout inlet and fall sufficiently with the draining liquid surface level for the weighted shuttle bottom to enter the lower funnel spout outlet and seat in a sealing relation;

c. The curvature and smoothness of the aspiratory shuttle are such that a sealing relation will be formed with the inner funnel spout inlet and outlet;

d. The hardness of the weighted shuttle bottom is equal to or slightly less than the double funnel housing, but the upper hollow shuttle top is made of a flexible plastic which can collapse and reinflate as demanded for aspiration during draining of the liquid in the system.

\* \* \* \* \*